United States Patent
Tanaka et al.

(10) Patent No.: US 12,237,466 B2
(45) Date of Patent: Feb. 25, 2025

(54) BATTERY

(71) Applicant: Panasonic Intellectual Property Management Co., Ltd., Osaka (JP)

(72) Inventors: Yoshiaki Tanaka, Kyoto (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 421 days.

(21) Appl. No.: 17/696,964

(22) Filed: Mar. 17, 2022

(65) Prior Publication Data

US 2022/0209287 A1    Jun. 30, 2022

Related U.S. Application Data

(63) Continuation of application No. PCT/JP2020/034799, filed on Sep. 15, 2020.

(30) Foreign Application Priority Data

Oct. 17, 2019 (JP) .................. 2019-190368

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC ..... H01M 10/0562; H01M 2300/0071; H01M 2300/008; H01M 2300/0065
See application file for complete search history.

(56) References Cited

U.S. PATENT DOCUMENTS

| 10,892,480 B2 * | 1/2021 | Goto ..................... H01M 4/382 |
| 2020/0144575 A1 * | 5/2020 | Ku ........................ H01M 4/587 |

(Continued)

FOREIGN PATENT DOCUMENTS

| CN | 116845344 A | * 10/2023 |
| JP | 2006-244734 | 9/2006 |

(Continued)

OTHER PUBLICATIONS

International Search Report of PCT application No. PCT/JP2020/034799 dated Dec. 1, 2020.

(Continued)

*Primary Examiner* — Amanda C. Walke
(74) *Attorney, Agent, or Firm* — GREENBLUM & BERNSTEIN, P.L.C.

(57) ABSTRACT

The battery includes a positive electrode, a first electrolyte layer, a second electrolyte layer, and a negative electrode arranged in this order. The first electrolyte layer contains a first solid electrolyte material and a second solid electrolyte material. In the first electrolyte layer, the mass ratio of the second solid electrolyte material to the first solid electrolyte material is greater than 0.05 and less than 1. The second electrolyte layer contains the second solid electrolyte material. The first solid electrolyte material is formed of Li, M, O, and X. In the first solid electrolyte material, M is at least one element selected from the group consisting of metal elements other than Li, and metalloids, and X is at least one element selected from the group consisting of Cl, Br, and I. The second solid electrolyte material has a composition different from that of the first solid electrolyte material.

15 Claims, 1 Drawing Sheet

(56) References Cited

U.S. PATENT DOCUMENTS

| | | | |
|---|---|---|---|
| 2020/0328465 A1 | 10/2020 | Sakaida et al. | |
| 2020/0350621 A1 | 11/2020 | Sugimoto et al. | |
| 2020/0350627 A1 | 11/2020 | Sugimoto et al. | |
| 2022/0102753 A1* | 3/2022 | Tanaka | H01M 4/621 |
| 2022/0246983 A1* | 8/2022 | Suzuki | H01M 10/052 |
| 2022/0393242 A1* | 12/2022 | Han | H01M 10/0569 |
| 2023/0042911 A1* | 2/2023 | Sasaki | H01M 4/36 |
| 2023/0106765 A1* | 4/2023 | Takeuchi | C01G 35/006 |
| | | | 429/323 |
| 2023/0268550 A1* | 8/2023 | Tanaka | H01B 1/08 |
| | | | 429/323 |
| 2023/0307704 A1* | 9/2023 | Tanaka | H01M 10/0562 |
| 2024/0047680 A1* | 2/2024 | Miyamoto | H01M 4/36 |
| 2024/0145704 A1* | 5/2024 | Miyamoto | H01M 4/366 |
| 2024/0178383 A1* | 5/2024 | Sagara | H01M 4/485 |

FOREIGN PATENT DOCUMENTS

| | | |
|---|---|---|
| WO | 2012/112229 A2 | 8/2012 |
| WO | 2019/135323 A1 | 7/2019 |
| WO | 2019/146294 | 8/2019 |
| WO | 2019/146296 A1 | 8/2019 |
| WO | WO-2021220924 A1 * 11/2021 | ............... H01B 1/08 |

OTHER PUBLICATIONS

English Translation of Chinese Search Report dated Oct. 28, 2024 for the related Chinese Patent Application No. 202080071776.6.

* cited by examiner

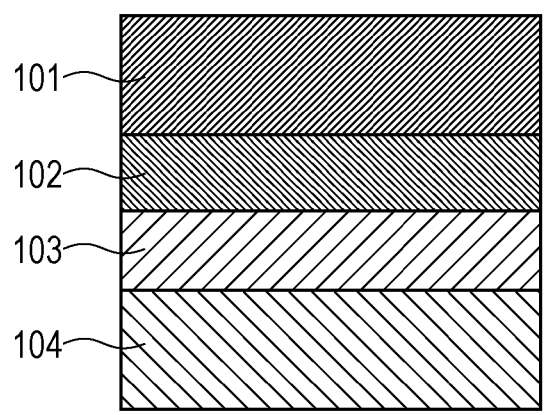

BATTERY

BACKGROUND

1. Technical Field

The present disclosure relates to a battery.

2. Description of the Related Art

International Publication No. 2019/146294 discloses a battery that includes a positive electrode, a first electrolyte layer containing a first solid electrolyte material, a second electrolyte layer containing a second solid electrolyte material, and a negative electrode that are arranged in this order. Here, the reduction potential of the second solid electrolyte material is lower than the reduction potential of the first solid electrolyte material.

SUMMARY

One non-limiting and exemplary embodiment provides a battery having high cycle characteristics.

In one general aspect, the techniques disclosed here feature a battery that includes a positive electrode, a first electrolyte layer, a second electrolyte layer, and a negative electrode arranged in this order, in which the first electrolyte layer contains a first solid electrolyte material and a second solid electrolyte material, in the first electrolyte layer, a mass ratio of the second solid electrolyte material to the first solid electrolyte material is greater than 0.05 and less than 1, the second electrolyte layer contains the second solid electrolyte material, the first solid electrolyte material is formed of Li, M, 0, and X, in the first solid electrolyte material, M is at least one element selected from the group consisting of metal elements other than Li, and metalloids, and X is at least one element selected from the group consisting of Cl, Br, and I, and the second solid electrolyte material has a composition different from that of the first solid electrolyte material.

The present disclosure provides a battery having high cycle characteristics.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGURE is a cross-sectional view of a battery 1000 according to an embodiment.

DETAILED DESCRIPTIONS

Hereinafter, an embodiment of the present disclosure is described with reference to the drawing.

FIGURE is a cross-sectional view of a battery 1000 according to an embodiment.

As illustrated in FIGURE, the battery 1000 according to the embodiment is equipped with a positive electrode 101, a first electrolyte layer 102, a second electrolyte layer 103, and a negative electrode 104 arranged in this order.

The first electrolyte layer 102 contains a first solid electrolyte material and a second solid electrolyte material. In the first electrolyte layer 102, the mass ratio of the second solid electrolyte material to the first solid electrolyte material is greater than 0.05 and less than 1.

The second electrolyte layer 103 contains the second solid electrolyte material.

The second solid electrolyte material has a composition different from that of the first solid electrolyte material.

The first solid electrolyte material contains Li, M, 0, and X. Here, M is at least one element selected from the group consisting of metal elements other than Li, and metalloids. X is at least one element selected from the group consisting of Cl, Br, and I.

The battery 1000 of this embodiment has high cycle characteristics.

A battery having high cycle characteristics is a battery that exhibits a high charge/discharge capacity retention ratio after repeating the charge/discharge cycle multiple times.

In the present disclosure, "metalloids" mean B, Si, Ge, As, Sb, and Te.

In the present disclosure, the "metal elements" mean the following:

(i) All elements included in groups 1 to 12 in the periodic table (however, hydrogen is excluded) and (ii) All elements included in groups 13 to 16 (however, B, Si, Ge, As, Sb, Te, C, N, P, O, S, and Se are excluded).

Here, the present inventors have studied a battery of related art such as the one disclosed in PTL 1, in other words, a battery that includes a positive electrode, an electrolyte layer formed of a first solid electrolyte material, an electrolyte layer formed of a second solid electrolyte material, and a negative electrode that are arranged in this order. The present inventors have found that, in a battery of related art such as the one disclosed in PTL 1, cracks may occur in, for example, the electrolyte layers. The cracks occur, for example, during the process of producing the battery. These cracks degrade cycle characteristics of the battery of the related art. However, in the battery 1000 of this embodiment, as mentioned above, the first electrolyte layer 102 contains not only the first solid electrolyte material but also the second solid electrolyte material also contained in the second electrolyte layer 103. In other words, the first electrolyte layer 102 and the second electrolyte layer 103 contain the second solid electrolyte material as a common material. Furthermore, in the first electrolyte layer 102, the mass ratio of the second solid electrolyte material to the first solid electrolyte material is greater than 0.05 and less than 1. When the first electrolyte layer 102 and the second electrolyte layer 103 have such features, occurrence of cracks in the battery 1000 of this embodiment is suppressed.

When the mass ratio of the second solid electrolyte material to the first solid electrolyte material in the first electrolyte layer 102 exceeds 0.05, occurrence of cracks can be suppressed. As a result, the cycle characteristics of the battery 1000 are improved. When the aforementioned mass ratio is less than 1, the internal resistance of the battery 1000 decreases. As a result, the discharge capacity of the battery 1000 is improved.

The first solid electrolyte material has a high ion conductivity. Thus, the first solid electrolyte material can be used to obtain a battery that has high output characteristics. The first solid electrolyte material also has excellent thermal stability.

The first solid electrolyte material is one example of oxyhalide solid electrolytes. Other examples of the oxyhalide solid electrolyte are materials composed of Li, O, and X (X is at least one element selected from the group consisting of Cl, Br, and I). The first solid electrolyte material contains M in addition to Li, O, and X. A first solid electrolyte material that contains M in addition to Li, O, and X has a higher ion conductivity than a material formed of Li, O, and X. Thus, using the first solid electrolyte material can improve the discharge capacity of the battery.

In order to further increase the cycle characteristics of the battery 1000, in the first electrolyte layer 102, the mass ratio of the second solid electrolyte material to the first solid electrolyte material may be greater than 0.05 and equal to or less than 0.50. In order to further increase the cycle characteristics of the battery 1000, this mass ratio may be greater than or equal to 0.10 and less than or equal to 0.50.

In order to increase the ion conductivity of the first solid electrolyte material, M may contain at least one element selected from the group consisting of Nb and Ta. The molar ratio of Li to M may be greater than or equal to 0.60 and less than or equal to 2.4, and the molar ratio of O to X may be greater than or equal to 0.16 and less than or equal to 0.35. Such a first solid electrolyte material has a high ion conductivity.

The first solid electrolyte material may be a material represented by chemical formula (1) below:

$$Li_\alpha MO_\beta X_\gamma \quad (1)$$

Here, in chemical formula (1), the following mathematical formulae are satisfied:

$1.0 \leq \alpha \leq 1.2$, $1.0 \leq \beta \leq 1.3$, and $3.6 \leq \gamma \leq 4.0$ A solid electrolyte material represented by chemical formula (1) has a high ion conductivity.

In chemical formula (1), M may be at least one element selected from the group consisting of Nb and Ta. In such a case, in chemical formula (1), mathematical formula: $\gamma = 5 + \alpha - 2\beta$ is satisfied. Such a first solid electrolyte material has a higher ion conductivity.

The first solid electrolyte material may be a material represented by chemical formula (3) below:

$$Li_x MO_y X_{(5+x-2y)} \quad (3)$$

Here, in chemical formula (3), the following mathematical formulae are satisfied:

$0.1 < x < 7.0$, and $0.4 < y < 1.9$.

A solid electrolyte material represented by chemical formula (3) has a high ion conductivity.

As mentioned above, the second solid electrolyte material has a composition different from that of the first solid electrolyte material. The second solid electrolyte material may have a lower reduction potential than the first solid electrolyte material. When the reduction potential of the second solid electrolyte material is lower than the reduction potential of the first solid electrolyte material, reduction of the first solid electrolyte material is suppressed. As mentioned above, the first solid electrolyte material has a high ion conductivity. Suppressing the reduction of the first solid electrolyte material improves charge/discharge efficiency of the battery 1000.

The first electrolyte layer 102 is preferably not in contact with the negative electrode 104. When the second electrolyte layer 103 that is electrochemically stable prevents the contact between the first electrolyte layer 102 and the negative electrode 104, reduction of the first solid electrolyte material contained in the first electrolyte layer 102 is suppressed. As a result, the battery 1000 has high charge/discharge efficiency.

The voltage at which reduction decomposition of the solid electrolyte occurs (in other words, the reduction potential) can be measured by a cyclic voltammetry method described in NPL "Adv. Energy Mater. 2016, 20, 1501590-1501599".

The second solid electrolyte material may be a halide solid electrolyte (however, oxyhalide solid electrolytes are excluded).

The halide solid electrolyte has high ion conductivity and excellent thermal stability as with the first solid electrolyte material. Thus, the battery 1000 that contains the first solid electrolyte material and the second solid electrolyte material has high output characteristics and thermal stability.

The second solid electrolyte material may be formed of Li, M', and X'. Here, M' is at least one element selected from the group consisting of metal elements other than Li, and metalloids, and X' is at least one element selected from the group consisting of Cl, Br, and I. Such a second solid electrolyte material has a high ion conductivity.

In order to increase the ion conductivity of the second solid electrolyte material, M' may contain Y (yttrium). Due to the improved ion conductivity, the battery 1000 has a high discharge capacity.

The second solid electrolyte material that contains Y may be a material represented by, for example, $Li_a Me_b Y_c X'_6$. Here, mathematical formulae: $a+mb+3c=6$ and $c>0$ are satisfied. Me is at least one element selected from the group consisting of metal elements other than Li and Y, and metalloids. Here, m represents the valence of Me.

In order to further increase the ion conductivity of the second solid electrolyte material, Me may be at least one element selected from the group consisting of Mg, Ca, Sr, Ba, Zn, Sc, Al, Ga, Bi, Zr, Hf, Ti, Sn, Ta, and Nb.

The second solid electrolyte material may be a material represented by chemical formula (2) below:

$$Li_{6-3z} Y_z X'_6 \quad (2)$$

Here, in chemical formula (2), mathematical formula: $0 < z < 2$ is satisfied. A solid electrolyte material represented by chemical formula (2) has a high ion conductivity. The second solid electrolyte material may be $Li_3 YCl_6$.

Another example of the halide solid electrolyte is $Li_2 MgX'_4$, $Li_2 FeX'_4$, $Li(Al, Ga, In)X'_4$, or $Li_3(Al, Ga, In)X'_6$. "(Al, Ga, In)" means "at least one element selected from the group consisting of Al, Ga, and In".

In order to increase the discharge capacity of the battery 1000, the second solid electrolyte material may be a sulfide solid electrolyte.

An example of the sulfide solid electrolyte used as the second solid electrolyte material is $Li_2 SP_2 S_5$, $Li_2S—SiS_2$, $Li_2S—B_2S_3$, $Li_2S—GeS_2$, $Li_{3.25} Ge_{0.25} P_{0.75} S_4$, or $Li_{10} GeP_2 S_{12}$. Furthermore, LiX", $Li_2O$, M"O, or $Li_p M"O_q$ may be added. Here, M" is at least one element selected from the group consisting of P, Si, Ge, B, Al, Ga, In, Fe, and Zn. Furthermore, p and q are both a natural number. X" is at least one element selected from the group consisting of F, Cl, Br, and I.

In order to increase the discharge capacity of the battery 1000, the second solid electrolyte material may contain lithium sulfide and phosphorus sulfide. The second solid electrolyte material may be $Li_2S—P_2S_5$.

In order to increase the output of the battery 1000 while suppressing short circuiting between the positive electrode 101 and the negative electrode 104, the total thickness of the first electrolyte layer 102 and the second electrolyte layer 103 may be greater than or equal to 1 μm and less than or equal to 300 μm.

The first electrolyte layer 102 may have the same thickness as the second electrolyte layer 103.

In order to increase the discharge capacity of the battery 1000, in the first electrolyte layer 102, the mass ratio of the total of the first solid electrolyte material and the second solid electrolyte material to the entire first electrolyte layer 102 may be greater than or equal to 70% or may be greater than or equal to 90%. In order to increase the discharge capacity of the battery 1000, the first electrolyte layer 102 may be solely formed of the first solid electrolyte material and the second solid electrolyte material.

In order to increase the discharge capacity of the battery 1000, in the second electrolyte layer 103, the mass ratio of the second solid electrolyte material to the entire second electrolyte layer 103 may be greater than or equal to 70% or may be greater than or equal to 90%. In order to increase the discharge capacity of the battery 1000, the second electrolyte layer 103 may be solely formed of the second solid electrolyte material.

The positive electrode 101 contains a positive electrode active material and an electrolyte material.

The positive electrode active material is a material that can store and release metal ions such as lithium ions.

An example of the positive electrode active material is a lithium-containing transition metal oxide, a transition metal fluoride, a polyanion, a fluorinated polyanion material, a transition metal sulfide, a transition metal oxysulfide, or a transition metal oxynitride. An example of the lithium-containing transition metal oxide is $Li(NiCoAl)O_2$, $Li(NiCoMn)O_2$, or $LiCoO_2$. Using a lithium-containing transition metal oxide as the positive electrode active material cuts the production cost and can increase the average discharge voltage of the battery 1000.

In order to further increase the discharge capacity and the energy density of the battery, the positive electrode active material may be lithium nickel.cobalt.manganate.

The positive electrode 101 may contain positive electrode active material particles as the positive electrode active material. In this case, the positive electrode active material may have a median diameter greater than or equal to 0.1 μm and less than or equal to 100 μm. When the positive electrode active material has a median diameter greater than or equal to 0.1 μm, the positive electrode active material and the electrolyte material can be dispersed satisfactorily in the positive electrode 101.

In this manner, the charge/discharge characteristics of the battery 1000 are improved. When the positive electrode active material has a median diameter less than or equal to 100 μm, the lithium diffusion rate in the positive electrode active material is improved. As a result, the battery can operate at high output.

The electrolyte material contained in the positive electrode 101 is, for example, a solid electrolyte.

The electrolyte material contained in the positive electrode 101 may be the first solid electrolyte material. In other words, the positive electrode 101 may contain the first solid electrolyte material. When the positive electrode 101 contains the same material as the first electrolyte layer 102, the charge/discharge capacity and the output characteristics of the battery are improved.

Hereinafter, a material different from the first solid electrolyte material and the second solid electrolyte material is referred to as a third solid electrolyte material.

The positive electrode 101 may contain the second solid electrolyte material or a third solid electrolyte material.

The third solid electrolyte material may be a sulfide solid electrolyte.

An example of the sulfide solid electrolyte is $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$. $LiX''$, $Li_2O$, $M''O_q$, or $Li_pM''O_q$ may be added to these. Here, $X''$ is at least one element selected from the group consisting of F, Cl, Br, and I. $M''$ is at least one element selected from the group consisting of P, Si, Ge, B, Al, Ga, In, Fe, and Zn. Furthermore, p and q are both a natural number.

The third solid electrolyte material may be an oxide solid electrolyte.

Examples of the oxide solid electrolyte include:
(i) a NASICON type solid electrolyte such as $LiTi_2(PO_4)_3$ or an element-substituted form thereof,
(ii) a perovskite type solid electrolyte based on $(LaLi)TiO_3$,
(iii) a LISICON type solid electrolyte such as $Li_{14}ZnGe_4O_{16}$, $Li_4SiO_4$, $LiGeO_4$, or an element-substituted form thereof,
(iv) a garnet type solid electrolyte such as $Li_7La_3Zr_2O_{12}$ or an element substituted form thereof,
(v) $Li_3PO_4$ or a N-substituted form thereof, or
(vi) a glass or glass ceramic obtained by adding $Li_2SO_4$ or $Li_2CO_3$ to a Li—B—O compound such as $LiBO_2$ or a $Li_3BO_3$.

The third solid electrolyte material may be a polymer solid electrolyte.

Examples of the polymer solid electrolyte include polymer compounds and compounds of lithium salts. The polymer compound may have an ethylene oxide structure. The polymer compound having an ethylene oxide structure can further increase the ion conductivity since a larger amount of lithium salts can be contained.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One lithium salt selected from these may be used alone. Alternatively, a mixture of two or more lithium salts selected from these may be used.

The third solid electrolyte material may be a complex hydride solid electrolyte.

An example of the complex hydride solid electrolyte is $LiBH_4—LiI$ or $LiBH_4—P_2S_5$.

The third solid electrolyte material may be an oxyhalide solid electrolyte different from the first solid electrolyte material. An example of the oxyhalide solid electrolyte is $Li_3OX''$ or $Li_2HOX''$. Here, $X''$ is at least one element selected from the group consisting of F, Cl, Br, and I.

The shape of the electrolyte material contained in the positive electrode 101 is not particularly limited. An example of the shape is a needle shape, a spherical shape, or an elliptical shape. For example, the shape of the electrolyte material may be granular.

When the shape of the electrolyte material contained in the positive electrode 101 is granular (for example, spherical), the median diameter of the electrolyte material may be less than or equal to 100 μm or less than or equal to 10 μm. In this manner, the positive electrode active material and the electrolyte material can be dispersed satisfactorily in the positive electrode 101. Due to satisfactory dispersing, the battery has a high charge/discharge characteristics.

The electrolyte material contained in the positive electrode 101 may have a median diameter less than that of the positive electrode active material. In this manner, the electrolyte material and the positive electrode active material can be more satisfactorily dispersed in the positive electrode 101. Due to satisfactory dispersing, the battery has high charge/discharge efficiency.

In order to increase the energy density and the output of the battery 1000, in the positive electrode 101, the ratio of the volume of the positive electrode active material to the total of the volume of the positive electrode active material and the volume of the electrolyte material may be greater than or equal to 0.30 and less than or equal to 0.95.

In order to increase the energy density and the output of the battery 1000, the positive electrode 101 may have a thickness greater than or equal to 10 µm and less than or equal to 500 µm.

The negative electrode 104 contains a negative electrode active material and an electrolyte material.

The negative electrode active material is a material that can store and release metal ions such as lithium ions.

An example of the negative electrode active material is a metal material, a carbon material, an oxide, a nitride, a tin compound, or a silicon compound. The metal material may be a single metal or an alloy. A example of the metal material is lithium metal or lithium alloy. An example of the carbon material is natural graphite, coke, graphitizing carbon, carbon fibers, spherical carbon, artificial graphite, or amorphous carbon. From the viewpoint of the capacity density, silicon (in other words, Si), tin (in other words, Sn), a silicon compound, or a tin compound is a preferable example of the negative electrode active material.

The negative electrode 104 may contain negative electrode active material particles as the negative electrode active material. In this case, the negative electrode active material may have a median diameter greater than or equal to 0.1 µm and less than or equal to 100 µm. When the negative electrode active material has a median diameter greater than or equal to 0.1 µm, the negative electrode active material and the electrolyte material can be dispersed satisfactorily in the negative electrode 104. As a result, the charge/discharge characteristics of the battery are improved. When the negative electrode active material has a median diameter less than or equal to 100 µm, the lithium diffusion rate in the negative electrode active material is improved. As a result, the battery can operate at high output.

The electrolyte material contained in the negative electrode 104 is, for example, a solid electrolyte.

The electrolyte material contained in the negative electrode 104 may be the second solid electrolyte material. In other words, the negative electrode 104 may contain the second solid electrolyte material.

The electrolyte material contained in the negative electrode 104 may be the third solid electrolyte material.

The shape of the electrolyte material contained in the negative electrode 104 is not particularly limited. An example of the shape is a needle shape, a spherical shape, or an elliptical shape. For example, the shape of the electrolyte material may be granular.

When the shape of the electrolyte material contained in the negative electrode 104 is granular (for example, spherical), the median diameter of the electrolyte material may be less than or equal to 100 µm or less than or equal to 10 µm. In this manner, the negative electrode active material and the electrolyte material can be dispersed satisfactorily in the negative electrode 104. Due to satisfactory dispersing, the battery has a high charge/discharge characteristics.

The electrolyte material contained in the negative electrode 104 may have a median diameter less than that of the negative electrode active material. In this manner, the electrolyte material and the negative electrode active material can be more satisfactorily dispersed in the negative electrode 104. Due to satisfactory dispersing, the battery has high charge/discharge efficiency.

From the viewpoint of the energy density and the output of the battery, in the negative electrode 104, the ratio of the volume of the negative electrode active material to the total of the volume of the negative electrode active material and the volume of the electrolyte material may be greater than or equal to 0.30 and less than or equal to 0.95.

In order to increase the energy density and the output of the battery, the negative electrode 104 may have a thickness greater than or equal to 10 µm and less than or equal to 500 µm.

In order to decrease the interface resistance, at least part of the surface of the positive electrode active material or at least part of the surface of the negative electrode active material may be covered with a coating material.

A material having low electron conductivity can be used as the coating material. An example of the coating material is the sulfide solid electrolyte, the polymer solid electrolyte, the complex hydride solid electrolyte, or the halide solid electrolyte listed as the example of the third solid electrolyte material. From the viewpoint of potential stability, a preferable example of the coating material is an oxide solid electrolyte. By using an oxide solid electrolyte as the coating material, the battery has higher charge/discharge efficiency.

Other examples of the oxide solid electrolyte used as the coating material include:

(i) Li—Nb—O compounds such as $LiNbO_3$,
(ii) Li—B—O compounds such as $LiBO_2$ or $Li_3BO_3$,
(iii) Li—Al—O compounds such as $LiAlO_2$,
(iv) Li—Si—O compounds such as $Li_4SiO_4$,
(v) Li—Ti—O compounds such as $Li_2SO_4$ or $Li_4Ti_5O_{12}$,
(vi) Li—Zr—O compounds such as $Li_2ZrO_3$,
(vii) Li—Mo—O compounds such as $Li_2MoO_3$,
(viii) Li-V—O compounds such as $LiV_2O_5$, or
(ix) Li—W—O compounds such as $Li_2WO_4$.

In order to increase the output of the battery, at least one selected from the group consisting of the first electrolyte layer 102 and the second electrolyte layer 103 may contain the aforementioned third solid electrolyte material.

At least one selected from the group consisting of the positive electrode 101, the first electrolyte layer 102, the second electrolyte layer 103, and the negative electrode 104 may contain a nonaqueous electrolyte solution, a gel electrolyte, or an ionic liquid in order to facilitate exchange of lithium ions and improve the output characteristics of the battery.

The nonaqueous electrolyte solution contains a nonaqueous solvent and a lithium salt dissolved in the nonaqueous solvent.

An example of the nonaqueous solvent is a cyclic carbonate solvent, a linear carbonate solvent, a cyclic ether solvent, a linear ether solvent, a cyclic ester solvent, a linear ester solvent, or a fluorine solvent. An example of the cyclic carbonate solvent is ethylene carbonate, propylene carbonate, or butylene carbonate. An example of the linear carbonate solvent is dimethyl carbonate, ethyl methyl carbonate, or diethyl carbonate. An example of the cyclic ether solvent is tetrahydrofuran, 1,4-dioxane, or 1,3-dioxolane. An example of the linear ether solvent is 1,2-dimethoxyethane or 1,2-diethoxyethane. An example of the cyclic ester solvent is γ-butyrolactone. An example of the linear ester solvent is methyl acetate. An example of the fluorine solvent is fluoroethylene carbonate, methyl fluoropropionate, fluorobenzene, fluoroethyl methyl carbonate, or fluorodimethylene carbonate. One nonaqueous solvent selected from these may be used alone. Alternatively, a mixture of two or more non-aqueous solvents selected from these may be used.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One lithium salt selected from these may be used alone. Alternatively, a mixture of two or more lithium salts selected from these may be used.

The lithium salt concentration is within the range of, for example, greater than or equal to 0.5 mol/L and less than or equal to 2 mol/L.

A polymer material impregnated with a nonaqueous electrolyte solution can be used as the gel electrolyte. An example of the polymer material is polyethylene oxide, polyacrylonitrile, polyvinylidene fluoride, polymethyl methacrylate, or a polymer having an ethylene oxide bond.

Examples of the cation contained in the ionic liquid are:
(i) aliphatic linear quaternary salts such as tetraalkyl ammonium or tetraalkyl phosphonium,
(ii) alicyclic ammonium such as pyrrolidiniums, morpholiniums, imidazoliniums, tetrahydropyrimidiniums, piperaziniums, or piperidiniums, or
(iii) nitrogen-containing heterocyclic aromatic cations such as pyridiniums or imidazoliums.

An example of the anion contained in the ionic liquid is $PF_6-$, $BF_4-$, $SbF_6-$, $AsF_6-$, $SO_3CF_3-$, $N(SO_2CF_3)_2-$, $N(SO_2C_2F_5)_2-$, $N(SO_2CF_3)(SO_2C_4F_9)-$, or $C(SO_2CF_3)_3-$. The ionic liquid may contain a lithium salt.

At least one selected from the group consisting of the positive electrode 101, the first electrolyte layer 102, the second electrolyte layer 103, and the negative electrode 104 may contain a binder in order to improve adhesion between particles.

An example of the binder is polyvinylidene fluoride, polytetrafluoroethylene, polyethylene, polypropylene, aramid resin, polyamide, polyimide, polyamideimide, polyacrylonitrile, polyacrylic acid, methyl polyacrylate, ethyl polyacrylate, hexyl polyacrylate, polymethacrylic acid, methyl polymethacrylate, ethyl polymethacrylate, hexyl polymethacrylate, polyvinyl acetate, polyvinylpyrrolidone, polyether, polyether sulfone, hexafluoropolypropylene, styrene butadiene rubber, or carboxymethyl cellulose.

A copolymer can also be used as a binder. An example of such a binder is a copolymer obtained from two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more materials selected from the aforementioned materials may be used as the binder.

At least one selected from the positive electrode 101 and the negative electrode 104 may contain a conductive additive to increase the electron conductivity.

Examples of the conductive additive are:
(i) graphite such as natural graphite or artificial graphite,
(ii) carbon black such as acetylene black or Ketjen black,
(iii) conductive fibers such as carbon fibers or metal fibers,
(iv) fluorocarbon,
(v) metal powder such as aluminum,
(vi) conductive whiskers such as zinc oxide or potassium titanate,
(vii) conductive metal oxides such as titanium oxide, or
(viii) conductive polymer compounds such as polyaniline, polypyrrole, or polythiophene.

In order to cut the cost, a conductive additive (i) or (ii) described above may be used.

An example of the shape of the battery according to a first embodiment is a coin type, a cylinder type, a prismatic type, a sheet type, a button type, a flat type, or a multilayer type.

Method for Producing First Solid Electrolyte Material

The first solid electrolyte material is, for example, produced by the following method.

Raw material powders are mixed to obtain a target composition. An example of the raw material powder is an oxide, a hydroxide, a halide, or an acid halide.

For example, when the target composition is $LiNbOCl_4$, LiCl and $NbOCl_3$ serving as raw material powders are mixed in a 1:1 molar ratio.

Selecting the raw material powders determines the elements represented by M and X. Adjusting the molar ratio of the raw material powders and the synthetic process determines the molar fractions of the elements constituting the first solid electrolyte material.

The raw material powders may be mixed at a molar ratio that has been preliminarily adjusted to cancel out the changes in composition that can occur during the synthetic process.

The raw material powders are mixed to obtain a mixed powder. The mixed powder is mechanochemically reacted with one another (in other words, through a mechanochemical milling process) in a mixing device such as a planetary ball mill to obtain a reaction product. The reaction product may be heat-treated in vacuum or an inert gas atmosphere (for example, an argon atmosphere or a nitrogen atmosphere). Alternatively, the mixed powder may be sintered in vacuum or an inert atmosphere to obtain a reaction product. Through these methods, a first solid electrolyte material is obtained.

The composition of the first solid electrolyte material can be determined by, for example, an analytical method such as an inductively coupled plasma emission analysis (in other words, ICP emission spectroscopy), ion chromatography, inert gas fusion-infrared absorption spectrometry, or an electron probe microanalyzer (EPMA) method. However, since the measurement accuracy for the oxygen content is low, an error of about 10% can be included.

Method for Producing Second Solid Electrolyte Material

The second solid electrolyte material is, for example, produced by the following method.

Raw material powders are mixed to obtain a target composition. An example of the raw material powder is a halide.

For example, when the target composition is $Li_3YCl_4$, LiCl and $YCl_3$ serving as raw material powders are mixed so that the molar ratio is 3:1.

Selecting the raw material powders determines the elements constituting the second solid electrolyte material. Adjusting the molar ratio of the raw material powders and the synthetic process determines the molar fractions of the elements constituting the second solid electrolyte material.

The raw material powders may be mixed at a molar ratio that has been preliminarily adjusted to cancel out the changes in composition that can occur during the synthetic process.

The raw material powders are mixed to obtain a mixed powder. The mixed powder is mechanochemically reacted with one another (in other words, through a mechanochemical milling process) in a mixing device such as a planetary ball mill to obtain a reaction product. The reaction product may be heat-treated in vacuum or an inert gas atmosphere (for example, an argon atmosphere or a nitrogen atmosphere). Alternatively, the mixed powder may be sintered in vacuum or an inert atmosphere to obtain a reaction product. Through these methods, a second solid electrolyte material is obtained.

The composition of the second solid electrolyte material can be determined by, for example, an analytical method such as an ICP emission spectroscopy, ion chromatography, inert gas fusion-infrared absorption spectrometry, or an EPMA method.

EXAMPLES

The present disclosure will now be described in further detail by referring to the examples below.

Example 1

Preparation of First Solid Electrolyte Material

In a dry atmosphere having a dew point equal to or lower than −30° C. (hereinafter referred to as a "dry atmosphere"), $Li_2O_2$ and $TaCl_5$ were prepared as raw material powders so that the molar ratio was $Li_2O_2:TaCl_5=1:2$. These raw material powders were ground in a mortar to obtain a mixed powder. The obtained mixed powder was processed through a mechanochemical reaction in a planetary ball mill (type P-7, produced by Fritsch Japan Co., Ltd.) at 600 rpm for 24 hours. Next, the mixed powder was heat-treated at 200° C. for 6 hours. As a result, a powder of the first solid electrolyte material of Example 1 was obtained. The first solid electrolyte material of Example 1 had a composition represented by $Li_{1.2}TaO_{1.3}Cl_{3.6}$.

Preparation of Second Solid Electrolyte Material

In a dry atmosphere, LiCl and $YCl_3$ serving as raw material powders were mixed so that the $LiCl:YCl_3$ molar ratio was 3:1. A second solid electrolyte material of Example 1 was obtained as with the first solid electrolyte material of Example 1 except for the aforementioned matter. The second solid electrolyte material of Example 1 had a composition represented by $Li_3YCl_6$.

Measurement of Reduction Potentials of First and Second Solid Electrolyte Materials The reduction potentials of the first solid electrolyte material and the second solid electrolyte material of Example 1 were measured by a cyclic voltammetry method. Specifically, the reduction potentials were measured by the following method.

In an insulating tube having an inner diameter of 9.5 mm, a SUS foil, a solid electrolyte material (100 mg), and a Li foil were stacked in this order. A pressure of 360 MPa was applied to the resulting multilayer body. Next, current collectors formed of stainless steel were attached to the top and the bottom of the multilayer body, and current collecting leads were attached to the current collectors. Lastly, the interior of the insulating tube was blocked from the outside atmosphere and hermetically sealed by using an insulating ferrule. A potential measurement cell was obtained as such.

The potential measurement cell was placed in a 25° C. constant temperature oven. The potential was scanned at a sweeping rate of 5 mV/s by cyclic voltammetry measurement from −0.5 V until 6 V was reached in terms of a Li-based potential.

The result found that the first solid electrolyte material of Example 1 had a reduction potential of 2.3 V. The second solid electrolyte material of Example 1 had a reduction potential of 0.3 V.

Preparation of Electrolyte Mixture

The first solid electrolyte material of Example 1 and the second solid electrolyte material of Example 1 were prepared so that the mass ratio was 10:1. These materials were mixed in an agate mortar. As a result, an electrolyte mixture of Example 1 was obtained.

Preparation of Positive Electrode Material

In a dry atmosphere, the first solid electrolyte material of Example 1 and $LiCoO_2$ (hereinafter referred to as "LCO") were prepared so that the volume ratio was 30:70. These materials were mixed in an agate mortar. As a result, a positive electrode material of Example 1 was obtained.

Preparation of Battery

In an insulating tube having an inner diameter of 9.5 mm, the positive electrode material of Example 1 (10 mg), the electrolyte mixture of Example 1 (80 mg), and the second solid electrolyte material of Example 1 (80 mg) were stacked in this order to obtain a multilayer body. A pressure of 360 MPa was applied to the multilayer body, and a positive electrode, a first electrolyte layer, and a second electrolyte layer were formed.

Next, an aluminum powder (20 mg) was stacked on the positive electrode. A pressure of 360 MPa was applied to the resulting multilayer body, and a positive electrode current collector was formed.

Next, a metal In foil (thickness: 200 μm), a metal Li foil (thickness: 300 μm), and a metal In foil (thickness: 200 μm) were stacked on the second solid electrolyte layer in this order to obtain a multilayer body. A pressure of 80 MPa was applied to the resulting multilayer body, and a negative electrode was formed. Current collectors formed of stainless steel were disposed on the positive electrode current collector and the negative electrode, and current collecting leads were attached to the current collectors formed of stainless steel.

Lastly, the interior of the insulating tube was blocked from the outside atmosphere by using an insulating ferrule to hermetically seal the interior of the tube. As a result, a battery of Example 1 was obtained.

Example 2

Preparation of First Solid Electrolyte Material

In a dry atmosphere, LiCl and $NbOCl_3$ serving as raw material powders were mixed so that the $LiCl:NbOCl_3$ molar ratio was 1:1. These raw material powders were ground in a mortar to obtain a mixed powder. The obtained mixed powder was processed through a mechanochemical reaction in a planetary ball mill at 600 rpm for 24 hours. As a result, a powder of the first solid electrolyte material of Example 2 was obtained. The first solid electrolyte material of Example 2 had a composition represented by $LiNbOCl_4$.

Measurement of Reduction Potential of First Solid Electrolyte Materials

The reduction potential of the first solid electrolyte material of Example 2 was measured as in Example 1. The first solid electrolyte material of Example 2 had a reduction potential of 2.9 V.

Preparation of Electrolyte Mixture

The first solid electrolyte material of Example 2 and the second solid electrolyte material of Example 1 were prepared so that the mass ratio was 10:2. These materials were mixed in an agate mortar. As a result, an electrolyte mixture of Example 2 was obtained.

Preparation of Positive Electrode Material

In a dry atmosphere, the first solid electrolyte material of Example 2 and LCO were prepared so that the mass ratio was 30:70. These materials were mixed in an agate mortar. As a result, a positive electrode material of Example 2 was obtained.

Preparation of Battery

A battery of Example 2 was obtained as in Example 1 except that the electrolyte mixture of Example 2 was used instead of the electrolyte mixture of Example 1.

Example 3

Preparation of Electrolyte Mixture

The first solid electrolyte material of Example 1 and the second solid electrolyte material of Example 1 were prepared so that the mass ratio was 10:5. These materials were mixed in an agate mortar. As a result, an electrolyte mixture of Example 3 was obtained.

Preparation of Battery

A battery of Example 3 was obtained as in Example 1 except that the electrolyte mixture of Example 3 was used instead of the electrolyte mixture of Example 1.

Example 4

Preparation of Second Solid Electrolyte Material

In an argon atmosphere having a dew point equal to or lower than −60° C. (hereinafter referred to as a "dry argon atmosphere"), $Li_2S$ and $P_2S_5$ were prepared as raw material powders so that the molar ratio was $Li_2S:P_2S_5=75:25$. These raw material powders were ground in a mortar to obtain a mixed powder. Next, the mixed powder was processed through a mechanochemical reaction in a planetary ball mill at 510 rpm for 10 hours. As a result, a glassy solid electrolyte was obtained. The obtained glassy solid electrolyte was heat-treated in a dry argon atmosphere at 270° C. for 2 hours. As a result, a powder of the second solid electrolyte material of Example 4, which was a glass ceramic-like solid electrolyte, was obtained. The second solid electrolyte material of Example 4 was a glassy solid electrolyte represented by $Li_2S$—$P_2S_5$.

Measurement of Reduction Potential of Second Solid Electrolyte Materials

The reduction potential of the second solid electrolyte material of Example 4 was measured as in Example 1. The second solid electrolyte material of Example 4 was stable relative to lithium.

Preparation of Electrolyte Mixture

The first solid electrolyte material of Example 1 and the second solid electrolyte material of Example 4 were prepared so that the mass ratio was 10:5. These materials were mixed in an agate mortar. As a result, an electrolyte mixture of Example 4 was obtained.

Preparation of Battery

A battery of Example 4 was obtained as in Example 1 except that the electrolyte mixture of Example 4 and the second solid electrolyte material of Example 4 were used instead of the electrolyte mixture of Example 1 and the second solid electrolyte material of Example 1.

Comparative Example 1

Preparation of Electrolyte Mixture

The first solid electrolyte material of Example 1 and the second solid electrolyte material of Example 1 were prepared so that the weight ratio was 10:0.5. These materials were mixed in an agate mortar. As a result, an electrolyte mixture of Comparative Example 1 was obtained.

Preparation of Battery

A battery of Comparative Example 1 was obtained as in Example 1 except that the electrolyte mixture of Comparative Example 1 was used instead of the electrolyte mixture of Example 1.

Comparative Example 2

Preparation of Battery

A battery of Comparative Example 2 was obtained as in Example 1 except that the first solid electrolyte material of Example 1 was used instead of the electrolyte mixture of Example 1. In other words, the first electrolyte layer of Comparative Example 2 contained only the first solid electrolyte material of Example 1 but not the second solid electrolyte material.

Charge/Discharge Test

The charge/discharge test was performed under the following conditions on the batteries obtained in Examples 1 to 4 and Comparative Examples 1 and 2.

Each of the obtained batteries was placed in a 25° C. constant temperature oven.

The battery was charged until a voltage of 4.2 V was reached at a current value of 360 ρA which gave a 0.3 C rate. Next, the battery was discharged at a current value of 360 ρA which gave a 0.3 C rate until a voltage of 3.1 V was reached.

The aforementioned charging and discharging were assumed to constitute one charge/discharge cycle. The charge/discharge cycle was performed 25 times.

The alloy formed of metallic In and metallic Li used in the negative electrode of each of the batteries has a potential of 0.6 V relative to lithium.

The discharge capacity retention ratios of the batteries of Examples 1 to 4 and Comparative Examples 1 and 2 were calculated from the charge/discharge test mentioned above. The discharge capacity retention ratio indicates the ratio of the discharge capacity after 25 cycles relative to the initial discharge capacity. The value of the discharge capacity retention ratio is indicated in Table. In Table, the mass ratio of the second solid electrolyte material to the first solid electrolyte material in the first electrolyte layer is indicated as a mass ratio of the electrolyte mixture.

TABLE

| | First solid electrolyte material | Second solid electrolyte material | Mass ratio of electrolyte mixture | Discharge capacity retention ratio (%) |
|---|---|---|---|---|
| Example 1 | $Li_{1.2}TaO_{1.3}Cl_{3.6}$ | $Li_3YCl_6$ | 0.10 | 96 |
| Example 2 | $LiNbOCl_4$ | $Li_3YCl_6$ | 0.20 | 98 |
| Example 3 | $Li_{1.2}TaO_{1.3}Cl_{3.6}$ | $Li_3YCl_6$ | 0.50 | 97 |
| Example 4 | $Li_{1.2}TaO_{1.3}Cl_{3.6}$ | $Li_2S$-$P_2S_5$ | 0.50 | 97 |
| Comparative Example 1 | $Li_{1.2}TaO_{1.3}Cl_{3.6}$ | $Li_3YCl_6$ | 0.05 | 90 |
| Comparative Example 2 | $Li_{1.2}TaO_{1.3}Cl_{3.6}$ | $Li_3YCl_6$ | 0 | 91 |

Studies

As apparent from Table, the batteries of Examples 1 to 4 have high discharge capacity retention ratios. In other words, the batteries of Examples 1 to 4 have high cycle characteristics.

Comparing the batteries of Examples 1 and 3 with the batteries of Comparative Examples 1 and 2, it is clear that a battery in which the mass ratio of the second solid electrolyte material to the first solid electrolyte material in the first electrolyte layer is less than or equal to 0.05 has a low discharge capacity retention ratio.

Comparing the battery of Example 3 with the battery of Example 4, it is clear that a battery having a high discharge capacity retention ratio is obtained as long as the second solid electrolyte material is a sulfide solid electrolyte or a halide solid electrolyte.

The battery of the present disclosure can be used in all-solid lithium ion secondary batteries, for example.

What is claimed is:

1. A battery comprising:
a positive electrode, a first electrolyte layer, a second electrolyte layer, and a negative electrode arranged in this order,
wherein:
the first electrolyte layer contains a first solid electrolyte material and a second solid electrolyte material,
in the first electrolyte layer, a mass ratio of the second solid electrolyte material to the first solid electrolyte material is greater than 0.05 and less than 1,
the second electrolyte layer contains the second solid electrolyte material,
the first solid electrolyte material is formed of Li, M, O, and X,
in the first solid electrolyte material, M is at least one element selected from the group consisting of metal elements other than Li, and metalloids, and X is at least one element selected from the group consisting of Cl, Br, and I, and
the second solid electrolyte material has a composition different from that of the first solid electrolyte material.

2. The battery according to claim 1, wherein:
the second solid electrolyte material has a reduction potential lower than a reduction potential of the first solid electrolyte material.

3. The battery according to claim 1, wherein:
the mass ratio is greater than 0.05 and less than or equal to 0.50.

4. The battery according to claim 3, wherein:
the mass ratio is greater than or equal to 0.10 and less than or equal to 0.50.

5. The battery according to claim 4, wherein:
M contains at least one element selected from the group consisting of Nb and Ta.

6. The battery according to claim 1, wherein:
the first solid electrolyte material is represented by chemical formula (1) below:

$$Li_\alpha MO_\beta X_\gamma \qquad (1)$$

where
M is at least one element selected from the group consisting of metal elements other than Li, and metalloids,
X is at least one element selected from the group consisting of Cl, Br, and I, and
following mathematical formulae are satisfied:

$1.0 \le \alpha \le 1.2$, $1.0 \le \beta \le 1.3$, and $3.6 \le \gamma \le 4.0$.

7. The battery according to claim 6, wherein:
M is at least one element selected from the group consisting of Nb and Ta, and
mathematical formula: $\gamma = 5 + \alpha - 2\beta$ is satisfied.

8. The battery according to claim 1, wherein:
the second solid electrolyte material is formed of Li, M' and X',
where
M' is at least one element selected from the group consisting of metal elements other than Li, and metalloids, and
X' is at least one element selected from the group consisting of Cl, Br, and I.

9. The battery according to claim 8, wherein:
M' contains yttrium.

10. The battery according to claim 9, wherein:
the second solid electrolyte material is represented by chemical formula (2) below:

$$Li_{6-3z}Y_zX'_6 \qquad (2)$$

where
X' is at least one element selected from the group consisting of Cl, Br, and I, and
mathematical formula: $0 < z < 2$ is satisfied.

11. The battery according to claim 10, wherein:
the second solid electrolyte material is $Li_3YCl_6$.

12. The battery according to claim 1, wherein:
the second solid electrolyte material is a sulfide solid electrolyte.

13. The battery according to claim 12, wherein:
the sulfide solid electrolyte contains lithium sulfide and phosphorus sulfide.

14. The battery according to claim 12, wherein:
the sulfide solid electrolyte is $Li_2S-P_2S_5$.

15. The battery according to claim 1, wherein:
the positive electrode contains the first solid electrolyte material.

* * * * *